(12) United States Patent
Li et al.

(10) Patent No.: US 11,810,267 B2
(45) Date of Patent: Nov. 7, 2023

(54) EFFICIENT SERVER-CLIENT MACHINE LEARNING SOLUTION FOR RICH CONTENT TRANSFORMATION

(71) Applicant: MICROSOFT TECHNOLOGY LICENSING, LLC, Redmond, WA (US)

(72) Inventors: Ji Li, San Jose, CA (US); Huan Yang, Beijing (CN); Jianlong Fu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 388 days.

(21) Appl. No.: 17/240,396

(22) Filed: Apr. 26, 2021

(65) Prior Publication Data

US 2022/0343461 A1    Oct. 27, 2022

(51) Int. Cl.
*G06T 3/40* (2006.01)
*G06N 20/00* (2019.01)

(52) U.S. Cl.
CPC ........... *G06T 3/4046* (2013.01); *G06N 20/00* (2019.01); *G06T 3/4084* (2013.01)

(58) Field of Classification Search
None
See application file for complete search history.

(56) References Cited

U.S. PATENT DOCUMENTS

2022/0138596 A1* 5/2022 Kumar ............... G06T 1/20
706/45

OTHER PUBLICATIONS

Chen, et al., "Bilateral Guided Upsampling", In Journal of ACM Transactions on Graphics, vol. 35, Issue 6, Nov. 11, 2016, 8 Pages.
Gharbi, et al., "Deep Bilateral Learning for Real-Time Image Enhancement", In Repository of arXiv:1707.02880v2, Aug. 22, 2017, 12 Pages.
Gharbi, et al., "Transform Recipes for Efficient Cloud Photo Enhancement", In Journal of ACM Transactions on Graphics, vol. 34, Issue 6, Nov. 2015, 12 Pages.
"International Search Report and Written Opinion Issued in PCT Application No. PCT/US22/023208", dated Jul. 22, 2022, 11 Pages.

* cited by examiner

*Primary Examiner* — Dov Popovici
(74) *Attorney, Agent, or Firm* — NovoTechIP International PLLC

(57) ABSTRACT

A system and method for rich content transformation are provided. The system and method allow rich content transformation to be separately processed on a client device and on a cloud-based server. The client device downsizes a rich content and transmits the downsized rich content to the cloud-based server via a network. The cloud-based server calculates function parameters based on the downsized rich content using one or more machine learning models included in the server. The calculated function parameters are transmitted to the client device via the network. The client device then applies these function parameters to the rich content on the client device to obtain the transformed rich content.

20 Claims, 10 Drawing Sheets

700 

```
┌─────────────────────────────────────────────────────────────────┐
│ Receive a rich content of a first size transmitted from a client device │
│ over a network, where the rich content of the first size is a content  │
│         downsized from an original rich content 701             │
└─────────────────────────────────────────────────────────────────┘
                                  │
                                  ▼
┌─────────────────────────────────────────────────────────────────┐
│ Identify one or more models to transform the rich content of the first │
│                         size 703                                │
└─────────────────────────────────────────────────────────────────┘
                                  │
                                  ▼
┌─────────────────────────────────────────────────────────────────┐
│ Determines one or more function parameters based on a processing │
│ of the rich content of the first size by the one or more models 705 │
└─────────────────────────────────────────────────────────────────┘
                                  │
                                  ▼
┌─────────────────────────────────────────────────────────────────┐
│ Transmit the one or more function parameters to the client device │
│ over the network, to allow the client device to transform the original │
│ rich content stored on the client device based on the one or more │
│                   function parameters 707                       │
└─────────────────────────────────────────────────────────────────┘
```

FIG. 7

EFFICIENT SERVER-CLIENT MACHINE LEARNING SOLUTION FOR RICH CONTENT TRANSFORMATION

BACKGROUND

Machine learning-based transformation (e.g., style transformation) on rich content like images and videos has wide applications in modern days. Typically, one or more machine learning models take the original content and generate the content with a target transformation (e.g., a target style). With the improvement of machine learning techniques, the transformation quality is approaching realistic images and videos and outperforming traditional filter-based transformation. For model integration, currently, there are two places to deploy a machine learning-based model for content transformation, a cloud-based server or a client device. For server-side deployment, it is easy to maintain and upgrade the machine learning-based model. Since the server is in the cloud with access to hardware accelerators like Graphics Processing Units (GPUs) or Field Programmable Gate Arrays (FPGAs), large and high-complexity models can be used, which then gives the most appealing transformation results. However, sending the transformed content like large-size images or videos may lead to a large amount of network traffic for a client device to download the transformed images or videos, not to mention the traffic to upload the original images or videos. For client-side deployment, there is no network traffic of content upload and download, since the model takes the content locally from a client device and applies the transformation within the same device. However, the model may consume the power of the client device. In addition, the complexity of the model may be limited by the local computing capability. This means that the transformation quality may be rather limited.

Hence, there is a need for an efficient approach for the deployment of machine learning modes to be applied to rich content transformation.

SUMMARY

In one aspect, a system for rich content transformation includes a processor, and a memory coupled to the processor and configured to store executable instructions that, when executed by the processor, cause the processor to receive a downsized rich content transmitted from a client device over a network, where the downsized rich content is a content downsized on the client device from an original rich content, identify one or more models to transform the downsized rich content, determine one or more function parameters based on a processing of the downsized rich content by the one or more models, and transmit the one or more function parameters to the client device over the network, to allow the client device to transform the original rich content stored on the client device based on the one or more function parameters.

The above general aspect may include one or more of the following features: a size of the downsized rich content is determined based on one or more of a purpose of the transformation of the original rich content, a bandwidth of the network, a traffic of the network, a size of the original rich content, or a format of the original rich content; the one or more models are identified based on a purpose of the transformation of the original rich content; the one or more models includes a machine learning model configured to transform the downsized rich content; the machine learning model includes a convolutional neural network configured to transform the downsized rich content; the one or more function parameters are applied to the original rich content on the client device, to transform the original rich content to a transformed rich content; the one or more function parameters are applied to a linear function on the client device to obtain the transformed rich content; the transformed rich content displays a different style from the original rich content on the client device after the transformation; the transformed rich content displays a different resolution from the original rich content on the client device after the transformation; the transformed rich content displays a different brightness from the original rich content on the client device after the transformation; the transformed rich content displays a different clarity from the original rich content on the client device after the transformation; to determine the one or more function parameters based on the processing of the downsized rich content by the one or more models, the executable instructions further include instructions that, when executed by the processor, cause the system to determine a first set of function parameters corresponding to content included in the downsized rich content, and determine a second set of function parameters corresponding to content not included in the downsized rich content but included in the original rich content; the first set of function parameters are determined in a process of transforming the downsized rich content by the one or more models; the network is a wireless network.

These general and specific aspects may be implemented using a system, a method, or a computer program, or any combination of systems, methods, and computer programs.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accordance with the present teachings, by way of example only, not by way of limitation. In the figures, like reference numerals refer to the same or similar elements. Furthermore, it should be understood that the drawings are not necessarily to scale.

FIG. 7 is a flowchart of an example method for calculating function parameters on a cloud-based server.

DETAILED DESCRIPTION

Figure 1:
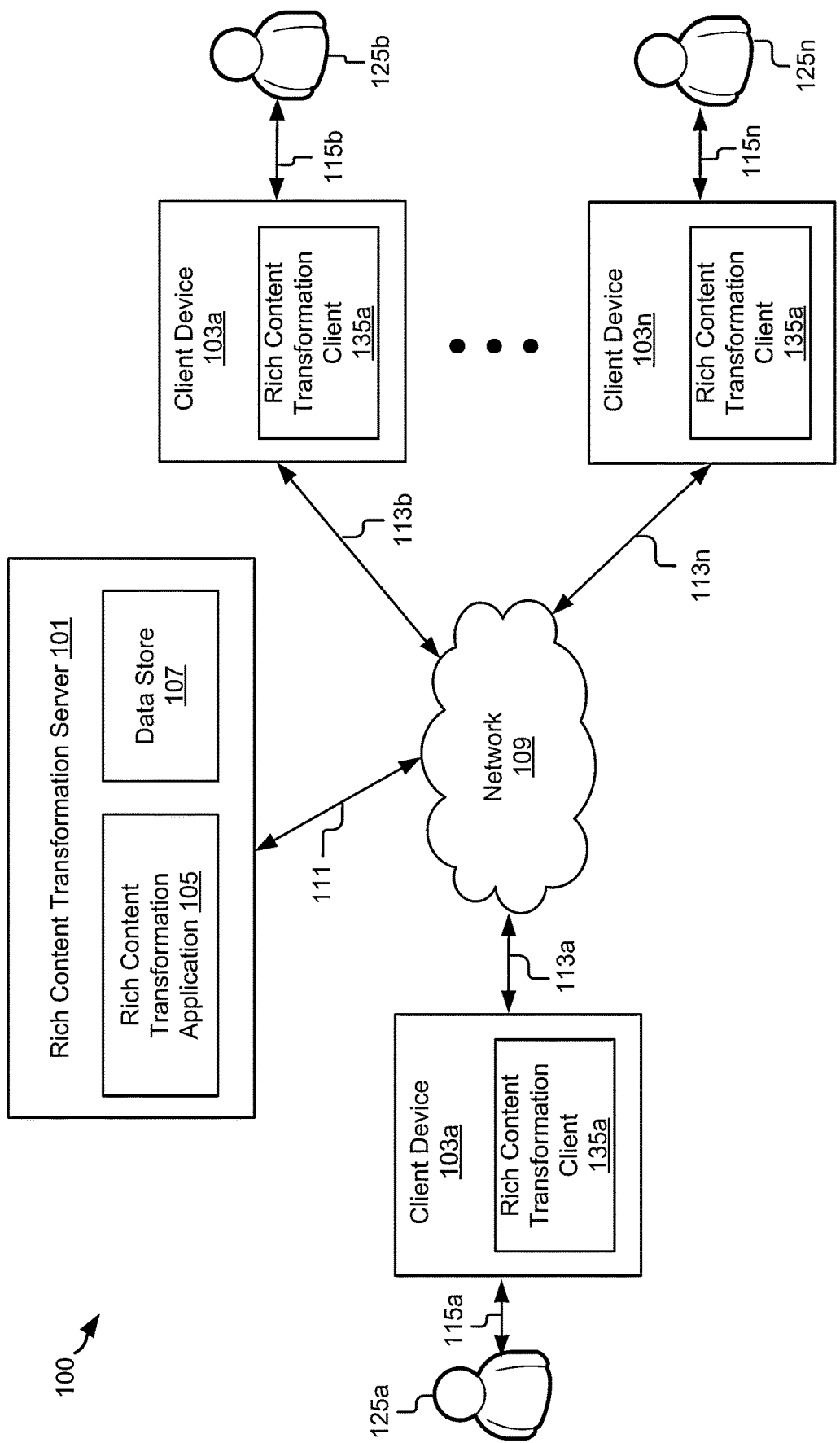
FIG. 1 is a block diagram of an example rich content transformation system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Due to the advancement of machine learning on image processing, machine learning model-based approaches are replacing traditional filter-based approaches on rich content transformation (e.g., image stylization). Currently, two places are being employed to deploy a machine learning-based model for content transformation, a cloud-based server or a client device. For server-side deployment, a machine learning-based model can be more powerful and easier to upgrade. However, uploading rich content like large-size images or videos to the cloud-based server and downloading the transformed content would lead to a large amount of network traffic for the client device. For client-side deployment, there is no network traffic of content upload and download since the model takes the content directly from a client device and applies the transformed result within the same device. However, the complexity of the model may be limited by the local computing capability of the client device. This means that the transformation quality may be rather limited. Therefore, the current server-side or client-side deployments of machine learning models in rich content transformation have respective technical problems.

The present disclosure provides a technical solution by breaking a content transformation process into two parts: one part on a cloud-based server and the other part on a client device. The server part may include a model that takes downsized content (e.g., downsized photo or video) as input and learns to output a set of function parameters. The client part may include a function that takes the function parameters as input and applies the function parameters on the original content, to get the transformed content for the original content.

The technical solutions disclosed herein may address the technical problems in the current machine learning model-based content transformation, and thus may provide technical improvements to the current content transformation systems. For instance, as the traffic between the server and a client device is just downsized content in upload and function parameters in download for the client device, the overall network or latency performance is good. In addition, since the model still resides in the cloud with access to high-performance computing resources, large and high-quality models may still be accessed without consuming a client device's power and without limitation by the client device's computing resources. This then promotes the application of machine learning model-based rich content transformation on many client devices with limited resources. Further, the technical solutions disclosed herein are also convenient for future model development or improvement from the server side to learn better function parameters. That is, the technical solutions disclosed herein may allow an improved performance of a client device without much effort from a client device due to the upgrade models on the server side.

The features and advantages described herein are not all-inclusive and many additional features and advantages will be apparent to one of ordinary skill in the art in view of the figures and the following description.

FIG. 1 is a block diagram of an example rich content transformation system 100. As shown, the system 100 includes a cloud-based rich content transformation server 101, and one or more client devices 103a-103n coupled for electronic communication with the server via a network 109. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of rich content transformation servers 101, client devices 103a-103n, or networks 109.

The network 109 may be a conventional type, wired and/or wireless, and may have numerous different configurations including a star configuration, token ring configuration, or other configurations. For instance, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In one implementation, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a-103n (or collectively client device 103) may include virtual or physical computer processors, memor(ies), communication interface(s)/device(s), etc., which, along with other components of the client device 103, are coupled to the network 109 via signal lines 113a-113n for communication with other entities of the system 100. In one implementation, the client device 103a-103n, accessed by users 125a-125n via signal lines 115a-115n respectively, may send and receive data to and from other client device(s) 103 and/or the rich content transformation server 101, and may further analyze and/or process the data. For example, the client devices 103a-103n may communicate with the rich content transformation server 101 to transmit downsized rich content to and receive function parameters from the rich content transformation server 101. Non-limiting examples of client device 103 may include a laptop computer, a desktop computer, a tablet computer, a mobile telephone, a personal digital assistant (PDA), a mobile email device, or any other electronic devices capable of processing information and accessing the network 109.

As depicted, the client device 103 includes a rich content transformation client 135. For example, the client device 103a includes a rich content transformation client 135a, and the client device 103n includes a rich content transformation client 135n. In one implementation, the user 125a may be a user interested in seeing transformed rich content from the client device 103a. The rich content transformation client 135a installed on the client device 103a may be configured to, responsive to user input from the user 125a, generate a request for initiating a rich content transformation, including downsizing the original rich content and transmitting the downsized rich content to the rich content transformation server 101. The rich content transformation client 135a may also be configured to receive function parameters processed and sent by the rich content transformation server 101, and then apply the received function parameters to the original rich content, to obtain the transformed rich content of the original rich content. The rich content transformation client 135a may be further configured to display the transformed rich content to the user, responsive to the request for the rich content transformation by the user 125a. The rich content transformation client 135 will be described in more detail below with reference to FIG. 2A.

The rich content transformation server 101 may be a computing device that communicates with one or more client devices 103 via a signal line 111 and the network 109 to provide certain rich content transformation-related computation for the one or more client devices 103. In one implementation, the rich content transformation server 101 receives a rich content from the user 125a via the client device 103a to request transformation of the rich content to an expected format or style. The rich content received from the client device 103a may be a rich content downsized from an original content, to facilitate the transmission of the rich content via the network 109. The rich content transformation server 101 supports functions performed by one or more machine machining-based models for rich content transformation. The rich content transformation server 101 may therefore calculate function parameters for rich content transformation using the one or more machine learning models included therein. The function parameters may be calculated based on the received downsized rich content, but can be applied to the original rich content on the client device 103a. After calculation, the rich content transformation server 101 may then send the function parameters to the client device 103a for the transformation of the original rich content.

As illustrated in FIG. 1, the rich content transformation server 101 includes a rich content transformation application 105, which is a server-side application that communicates with the client-side application residing on a client device 103a, e.g., a rich content transformation client 135a, to implement machine learning model-based rich content transformation. The rich content transformation application 105 may include various machine learning models for rich content transformation. These models may have different capacities, complexity, and include different neural networks. In one implementation, the models inside the rich content transformation application 105 may include multiple models, where each model may be responsible for the transformation of one image style (e.g., a model specifically for X-Pro II and another different model specifically for Sutro, etc.). Alternatively, the models inside the rich content transformation application 105 may include a single model to perform rich content transformation for multiple image styles (e.g., image styles X-Pro II, Sutro, Walden, Nashville, 1977, etc.). One way to achieve a transformation of multiple styles by a single model is to include conditional instance normalization layers within a convolutional neural network in a model so that a stylized image can be conditioned on an additional model input.

In one implementation, the models inside the rich content transformation application 105 may also include machine learning models for non-style transformation, such as transforming a blurry image to a clear image, improving image resolution, improving video resolution, improving the brightness of an image, etc. In some implementations, any machine learning model for rich content transformation may be included in the rich content transformation application 105. In some implementations, non-machine learning-based models may be also included in the rich content transformation application 105 and used for rich content transformation, especially for handling some rich contents with large size.

In one implementation, the rich content transformation application 105 may calculate function parameters for the downsized rich content transmitted from a client device 103a. Based on the goal of the transformation, the rich content transformation application 105 may select a proper model from one or more models included therein, and calculate function parameters using the downsized rich content. In some implementations, when calculating the function parameters using the downsized rich content, the rich content transformation application 105 may take into consideration the information of the original rich content. For instance, when receiving the downsized rich content, the rich content transformation application 105 may also receive from the client device 103 the relevant information for the original rich content, such as the size, the downsizing ratio, the metadata, etc. Accordingly, while the downsized rich content is used in the calculation, the calculated function parameters may be used for the transformation of the original content by taking into consideration the information of the original rich content. The rich content transformation application 105 will be described in detail below with reference to FIG. 2B.

In one implementation, the rich content transformation server 101 also includes a data store 107. The data store 107 stores any information related to the operations described herein, such as the downsized rich content transmitted from a client device 103a, other information related to the downsized rich content, the type of transformation to be performed, calculated function parameters for transformation, the device information of the client device 103a submitting the request, the network information corresponding to the client device 103a, etc.

Figure 2A:
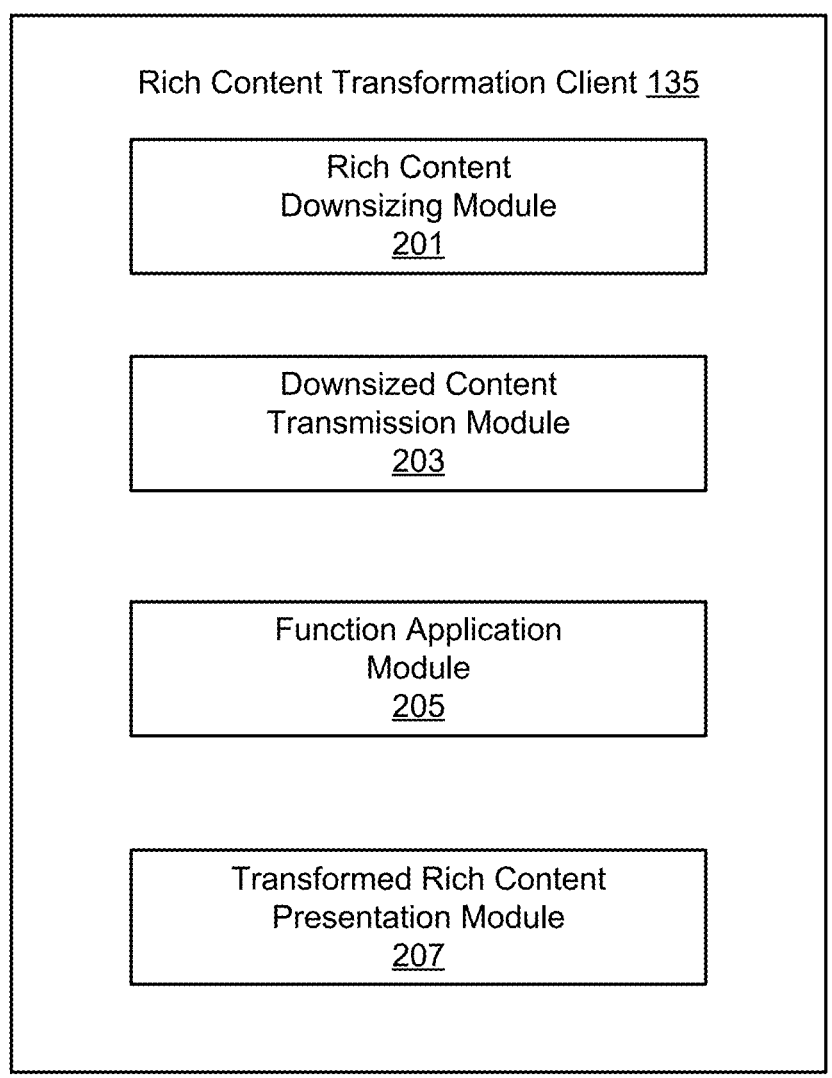
FIG. 2A is a block diagram of example components of a rich content transformation client residing on a client device.

Referring now to FIG. 2A, a block diagram of example components of a rich content transformation client 135 residing on a client device 103 is described. The rich content transformation client 135 includes hardware and/or software logic for implementing certain simple operations in rich content transformation, but leaves more complicated computation to a cloud-based server, as will be described later. In one implementation, the rich content transformation client 135 includes a rich content downsizing module 201, a downsized content transmission module 203, a function application module 205, and a transformed rich content presentation module 207.

The rich content downsizing module 201 may downsize an original rich content to a proper size for upload to the cloud-based rich content transformation server 101 for function parameter calculation. A rich content (e.g., image or video) generally has a large size when compared to other non-rich contents (e.g., word documents). If a rich content is not downsized and is transmitted directly to the rich content transformation server 101, a lot of bandwidth may be consumed, especially for videos and other rich content with large size. This may cause latency and thus affect the performance of the rich content transformation application. The downsizing of the original rich content for transmission may greatly reduce the bandwidth required for transmission and thus decrease the latency experienced by a user in rich content transformation.

In one implementation, the rich content downsizing module 201 may use different techniques to downsize rich content. For instance, for an image, the rich content downsizing module 201 may decrease the resolution of the image in downsizing the image, or compress the image use an image compressor to downsize the image. Other techniques for downsizing an image are also possible and are contemplated in the present disclosure. For a video, the rich content downsizing module 201 may downsize each frame of the video using similar techniques for downsizing an image. Alternatively, the rich content downsizing module 201 may skip certain frames in downsizing the video. Other techniques for downsizing a video are also possible and are contemplated in the present disclosure. In some implementations, there may be rich content other than image and video, the corresponding techniques for downsizing such rich content also exist and thus are contemplated.

In implementations, many different factors are taken into consideration in determining the degree of the downsizing (e.g., what is the downsized resolution for an image). In one implementation, the rich content downsizing module 201 may consider the type of requested transformation in downsizing the rich content, since different types of transformation may require different information in content transformation. For instance, transforming a blurry image to a clear one may be downsized at a different degree when compared to transforming a photo to a certain style. In another implementation, the rich content downsizing module 201 may also consider the overall latency that the content transformation allows. For instance, for a video used for streaming, the expected latency may be minimal, and thus the degree of downsizing a video may be greater when compared to downsizing a single image, in which the latency is not so important. The above description is just two example factors that the rich content downsizing module 201 may consider in downsizing the rich content. There are many other factors, such as the bandwidth of the network 109 for transmission, the real-time traffic of the network 109, the rich content size, the rich content format, etc., all of which may be considered by the rich content downsizing module 201 in determining the degree (or the ratio or scale) of the downsizing. The overall goal of downsizing the rich content by the rich content downsizing module 201 is to minimize the traffic caused by the transmission of the downsized rich content without affecting the performance of the eventually transformed rich content. In one implementation, once the rich content is downsized by the rich content downsizing module 201, the downsized rich content may be transmitted to the rich content transformation server 101 for calculation of the function parameters.

The downsized content transmission module 203 of the rich content transformation client 135 may then transmit the downsized rich content to the rich content transformation server 101. The rich content transformation server 101 may establish and maintain channels for communication with one or more client devices 103. A channel is a computer path that transfers data and signals between two computing devices. For example, the rich content transformation client 135a on the client device 103a may call a first Application Programming Interface (API) function to set up a peer-to-peer information route to exchange data with the rich content transformation application 105 of the rich content transformation server 101. Once the data transmission is complete, the rich content transformation client 135a may call a second API function to close the information route or channel. In one implementation, the transmission between the rich content transmission server 101 and the client device 103a is not considered as complete until the function parameters are transmitted back to the client device 103a. Therefore, the information route or call between the rich content transmission server 101 and the client device 103a may not be closed until the function parameters are transmitted back to the client device 103a.

In one implementation, a channel may be a media channel. The media channel is configured to transmit the rich content from the client device 103a to the rich content transformation server 101. In some embodiment, the to-be-transmitted rich content (e.g., an image or video) may have been downsized by the client device 103a before the transmission through the media channel as described above. Accordingly, the rich content transformation client 135a may transmit the downsized rich content but not the original rich content from the client device 103a to the rich content transformation server 101. It is to be noted that in some implementations, rich content may not be necessarily downsized, and the rich content transmitted to the rich content transformation server 101 may have an original size (e.g., a compressed image or an image already in low resolution), which may still be used by the rich content transformation server 101 to calculate the function parameters for transformation. The calculation of function parameters will be described in more detail below with reference to FIG. 2B.

Figure 2B:
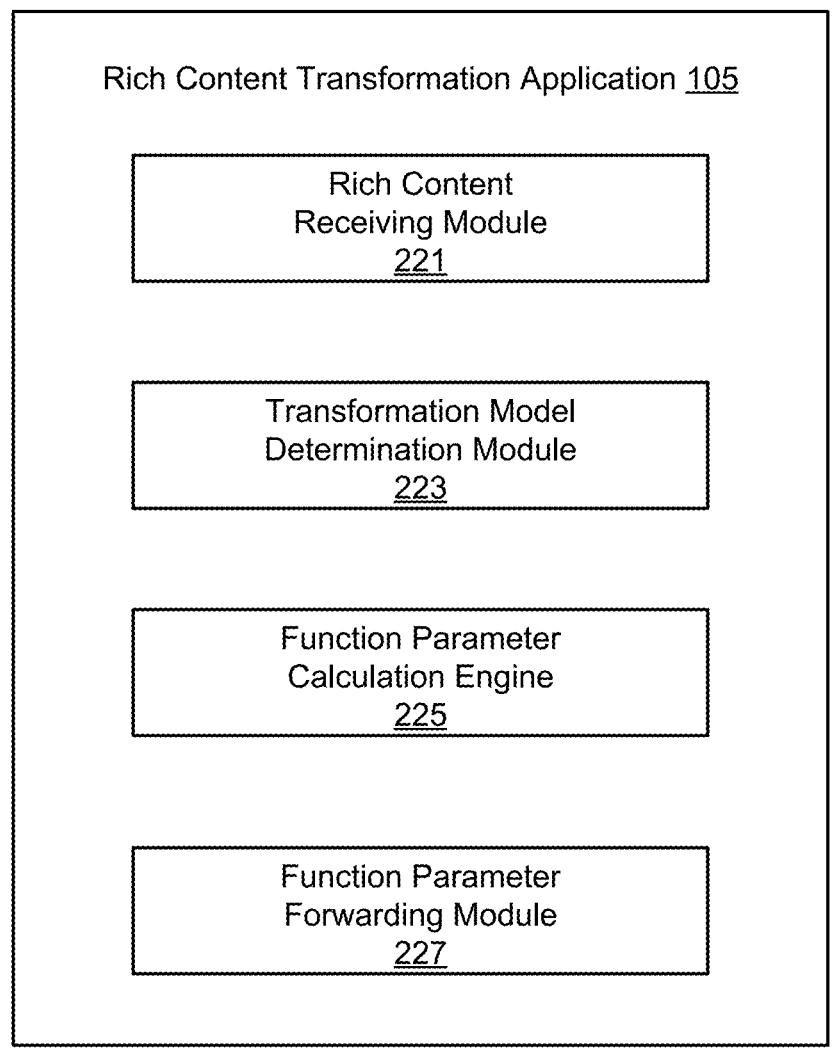
FIG. 2B is a block diagram of example components of a rich content transformation application residing on a rich content transformation server.

FIG. 2B is a block diagram of example components of a rich content transformation application 105 residing on the rich content transformation server 101. The rich content transformation application 105 includes hardware and/or software logic for automatically calculating function parameters for rich content transformation. In one implementation, the rich content transformation application 105 includes a rich content receiving module 221, a transformation model determination module 223, a function parameter calculation engine 225, and a function parameter forwarding module 227.

The rich content receiving module 221 may receive the downsized rich content from the client device 103a. In one implementation, when receiving the downsized rich content, the rich content receiving module 221 may also receive other information related to the downsized rich content as well as information related to the original rich content. For instance, the rich content receiving module 221 may receive the metadata for the original content including the resolution, the size, the format, and the date and time (e.g., night) that the rich content was produced, etc. Other information received by the rich content receiving module 221 may include the scale of downsizing, a technique used to downsize, the network information, etc. In addition, the rich content receiving module 221 may also receive the specific information of the transformation request, such as the type of request, sent by the client device 103a. In some implementations, the rich content receiving module 221 may store partial or all the received data and information in the data store 107.

The transformation model determination module 223 may determine a specific model to be used for calculating the function parameters for rich content transformation. In some implementations, the rich content transformation application 105 may include a plurality of machine learning models or non-machine learning models that may be applied to transform different rich content for different requests. Since the rich content transformation server 101 may offer cloud-based transformation, many different models may be included in the rich content transformation application 105, to provide transformation service to different users that may have different types of requests. Accordingly, the transformation model determination module 223 may determine a proper model for the calculation of the function parameters. The transformation model determination module 223 may look into the request information received from the client device 103a and determine the type of model to be used for calculating the function parameters. In some implementations, the transformation model determination module 223 may also look into the downsized rich content in determining the proper model for the calculation. For instance, different models may be selected for the calculation of function parameters for image or video even the requests have the same type (e.g., both requests may aim to increase the resolution). In one implementation, the transformation model determination module 223 may not determine a specific model since an advanced machine learning model included in the rich content transformation application 105 may handle various types of transformations.

The function parameter calculation engine 225 may determine function parameters to be used for rich content transformation on a client device 103a. The function parameter calculation engine 225 may rely on the model selected by the transformation model determination module 223 to calculate the function parameters. In one implementation, the selected model may be a machine learning model developed for the requested transformation. For instance, if the requested transformation is to transform a captured photo to an X-Pro II style photo, a machine learning model developed for X-Pro II style transformation may be selected for the calculation of function parameters for transforming a photo to the X-Pro II style. In one implementation, the selected machine learning model may be a convolution neural network that includes multiple layers for rich content transformation. The machine learning model may be pre-trained for X-Pro II style transformation, and thus when the model is input with a rich content such as a user captured photo, the machine learning model may readily perform certain image transformation, including calculating necessary function parameters used for image transformation to the X-Pro II style.

In one implementation, inputs other than the downsized rich content may be used for calculating the function parameters. For instance, depending on the target transformation style, the inputs to the machine learning model may include additional position information related to the downsized rich content. For example, for certain old-day image styles, the corners are generally darker, which may be reflected in the input when calculating the function parameters.

In one implementation, since the input rich content for calculating the function parameters is downsized rich content, the calculated function parameters may include function parameters for the downsized rich content (e.g., for the pixels included in the downsized rich content). Accordingly, to allow the calculated function parameters to be applied to transform the original content on a client device, the function parameter calculation engine 225 may further determine function parameters for other content included in the original rich content but not in the downsized rich content (e.g., for other pixels included in the original content but not in the downsized rich content). In one implementation, the function parameter calculation engine 225 may communicate with the rich content receiving module 221 to obtain the downsizing technique that has been used and/or the degree (e.g., scale/ratio) of the downsizing. Based on the obtained information, the function parameter calculation engine 225 may determine function parameters for the other pixels in the original content. In one implementation, the function parameters for other content or other pixels may not be determined on the server side but rather on the client side. In this way, the transformed function parameters may be smaller, which then minimizes the bandwidth used for transmission of the calculated function parameters.

In one implementation, when training a machine learning model for rich content transformation, the model may be trained to predict function parameters for the original rich content (e.g., for all the pixels in an original image) based on the downsized rich content. For instance, during the training of such a model, the metadata information of the original rich content, downsizing degree information, etc., may be input together with the downsized rich content as the input, to train the machine learning model to calculate function parameters for the original content (e.g., function parameters for all pixels in an original image). The as-such trained machine learning model may then calculate function parameters that can be directly applied to the transformation of the original rich content without further processing. In one implementation, the rich content received by the rich content transformation application 105 may not be downsized, but rather have an original size. At this moment, the calculated function parameters may be also directly transmitted to the client device 103a without determining function parameters for other content (e.g., other pixels in an image and/or other frames in a video).

The function parameter forwarding module 227 may forward the calculated function parameters to the client device 103a. The channel used for the transmission of the downsized rich content from the client device may be used here for the transmission of the calculated function parameters. In one implementation, due to the much smaller size of the function parameters when compared to the rich content (even downsized rich content), a different channel may be established for the transmission of the calculated function parameters. As described earlier, by just transmitting function parameters, instead of the whole transformed rich content, the bandwidth required for the transmission between the rich content transformation server 101 and the client device 103a may be greatly reduced, thereby reducing the latency in delivering the transformed rich content to the user 125a.

Referring back to FIG. 2A, the rich content transformation client 135 may receive the function parameters transmitted by the function parameter forwarding module 227. The function application module 205 of the rich content transformation client 135 then applies the received function parameters to the original content to get the transformed rich content.

In one implementation, the function application module 205 may include a function (e.g., an efficient approximation function) for transforming the original rich content to a transformed rich content. The function may be a very simple function that just applies the calculated function parameters to the original rich content to get the transformed rich content. That is, the function itself does not perform complicated function parameter calculation and thus can remain very small in size. Therefore, even a client device with very limited resources can perform this very simple function easily.

In one implementation, the function included in the function application module 205 may be a linear function, which is very easy to perform by the client device 103a. For instance, the calculated function parameters may be just output pixel values for each pixel of the original rich content if the original rich content is an image or video. By applying a linear function, the function application module 205 may just apply the output pixel values to replace the original pixel values to generate the transformed rich content. Depending on the type of function parameters calculated by the function parameter calculation engine 225, there may be other types of linear functions included in the function application module 205. In some implementations, even non-linear functions may be also included in the function application module 205, depending on the type of function parameters calculated by the function parameter calculation engine 225 on the server. In general, these linear or non-linear functions require very simple computation, which thus does not consume much power of the client device 103a and does not require complicated computing resources by the client device 103a, which therefore promotes the application of the disclosed rich content transformation system 100. Once the original rich content is transformed by the function application module 205, the transformed rich content is then presented to the user 125a requesting the transformation.

The transformed rich content presentation module 207 may then present the transformed rich content to the user 125a. The presentation may include a display of transformed rich content on a display of the client device 103a, which may allow the user 125a to either save or perform other processing on the transformed rich content as desired. If it is a video stream, the transformed video stream may be instantly placed on the client device 103a to allow the user 125a to enjoy the video in a format he/she expects to see.

Figure 3:
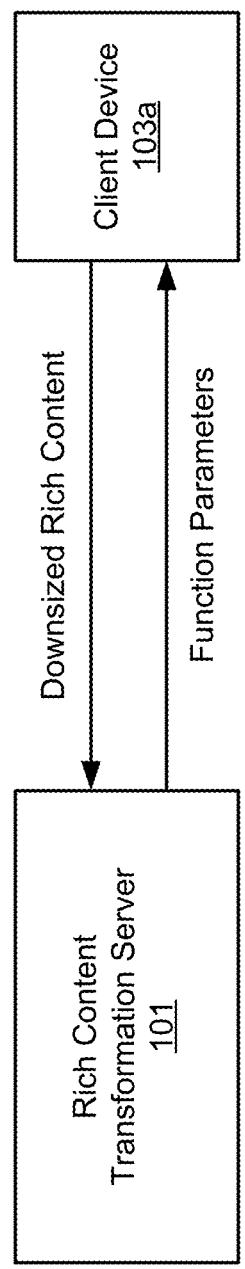
FIG. 3 is a block diagram of an example communication between a rich content transformation server and a client device.

As can be seen from the above, on the client side, the rich content transformation client 135 performs every limited processing (e.g., downsizing, applying function parameters) during a rich content transformation process, while leaving the complicated function parameter calculation process on a cloud-based server that can be very powerful and handle complicated transformation calculations in a very short period of time. This then makes the whole transformation process smooth and easy to achieve even for a client device with very limited resources. In addition, as shown in FIG. 3, only downsized rich content, instead of the original size rich content, is transmitted by the client device 103a to the rich content transformation server 101, and only function parameters, instead of the transformed rich content, is transmitted by the rich content transformation server 101 to the client device 103a, the bandwidth consumed by the disclosed rich content transformation system 100 can be greatly reduced compared to other existing cloud-based rich content transformation systems. The additional features and advantages will be apparent in view of the following example applications in FIGS. 4A-5D.

Figure 4:
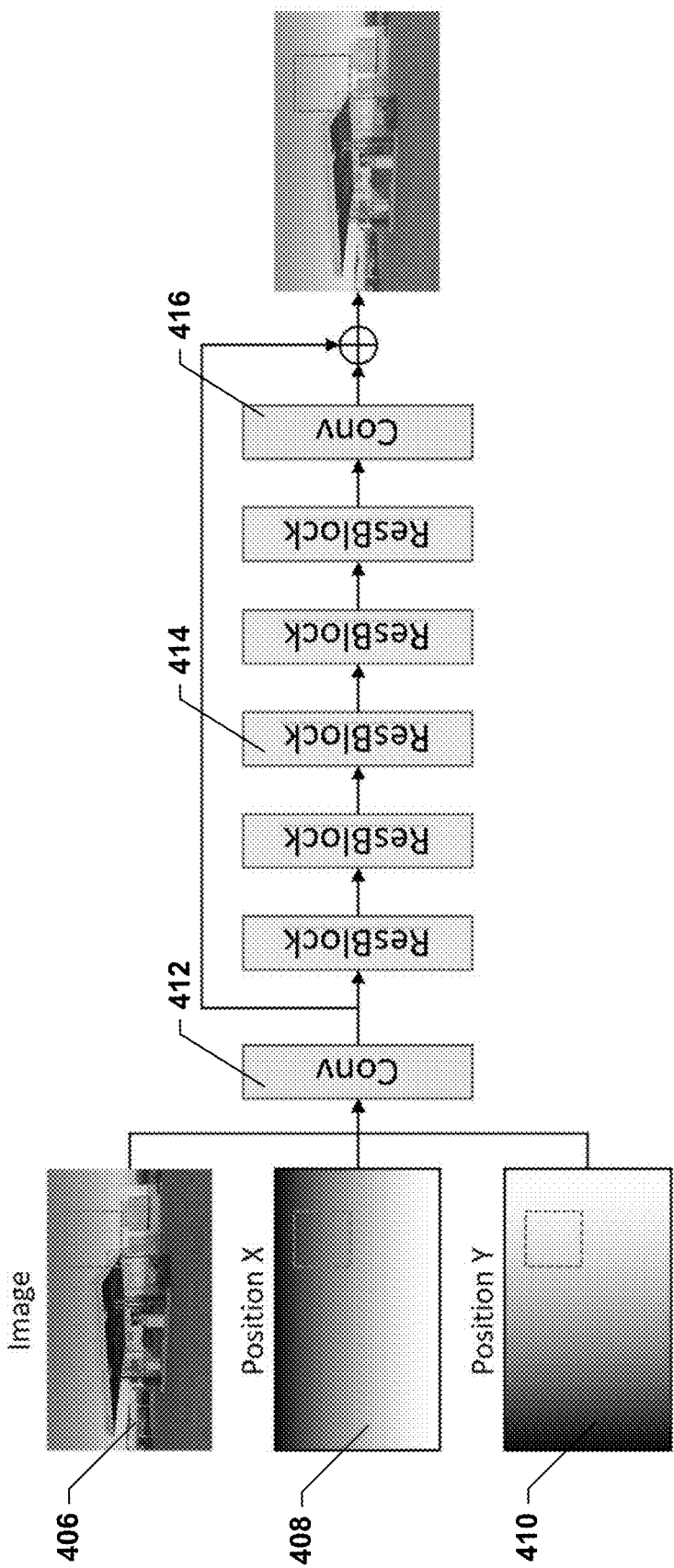
FIG. 4 is an example machine learning model for a style transformation.

FIG. 4 is an example machine learning model for a style transformation. The example machine learning model may be included in the rich content transformation application 105 on the rich content transformation server 101. As can be seen, the machine learning model may include two convolution blocks 412 and 416, and five ResBlocks 414. The first convolution block 412 may be used to extract the features of the inputs 406, 408, and 410. The five ResBlocks 414 may be used to further calculate the transformation parameters. The last convolution block 416 may be used to convert the calculated parameters, which are added to the features extracted from the first convolution block 412, to get the eventual function parameters that can be applied to the linear function by the rich content transformation client 135 on the client device 103a. As illustrated, the machine learning model may take three inputs, where the first input is the image 410, the second and third inputs are the positions in coding, since some stylization may relate to the positions within an image. For instance, for old-style photos, the corners should be dark, which should be reflected in the model input. Accordingly, by taking the positions as a part of the inputs, the transformation photo may more accurately represent the style to be achieved. It should be understood that the machine learning model shown in FIG. 4B is just one example model that the rich content transformation server 101 may host. In actual applications, there may be many other machine learning models that can be applied to different types of rich content transformation, as further described in detail below with reference to FIGS. 5A-5D.

Figure 5:
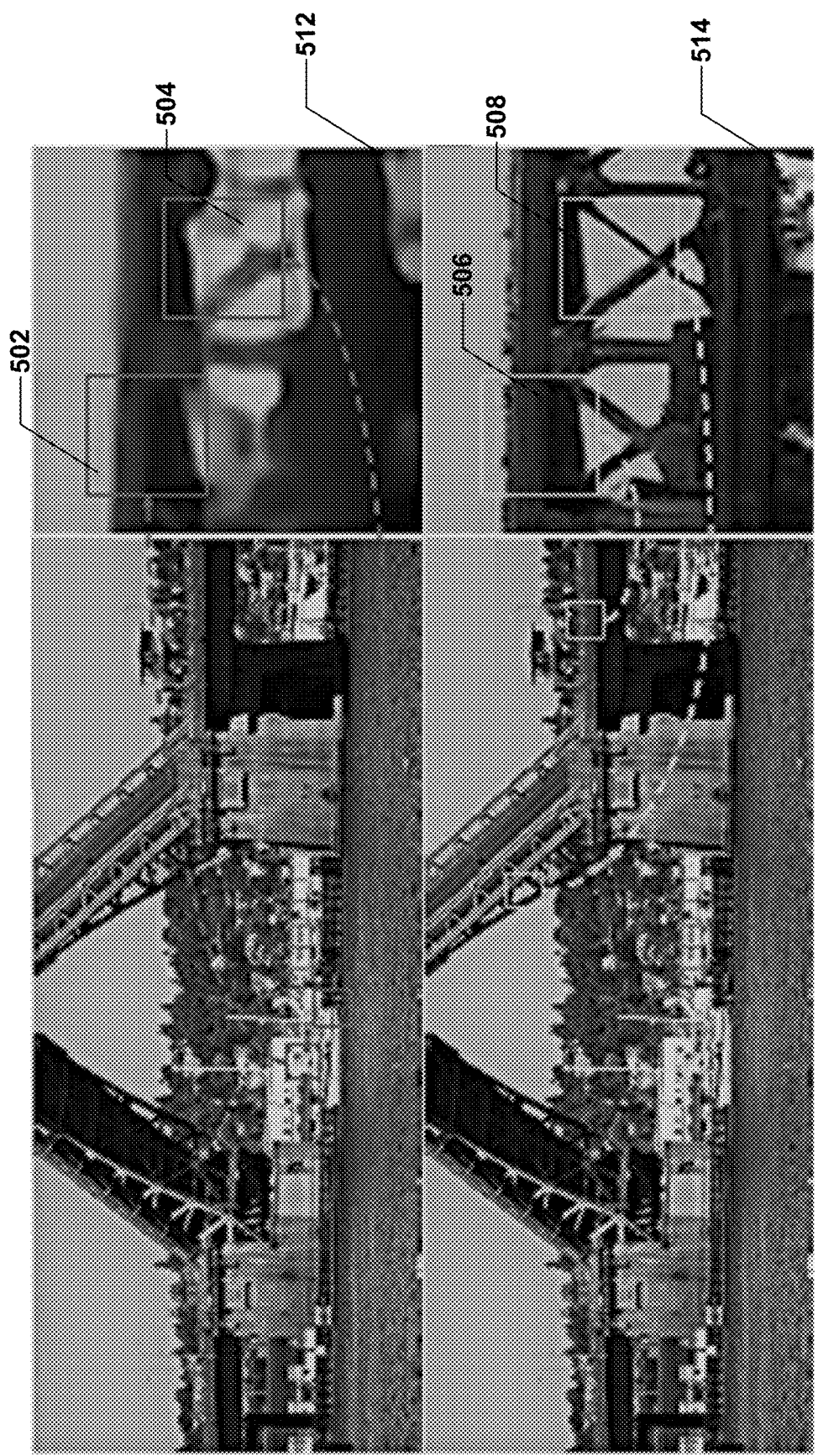
FIG. 5 is an example rich content transformation.

FIG. 5 shows an example rich content transformation. Specifically, FIG. 5 shows an example improved image resolution of an image 512. As depicted, the original rich content (i.e., image 512) includes some parts that have a low resolution, as can be seen from boxes 502 and 504 marked in the figure. After transformation by the disclosed rich content transformation system 100, the transformed image 514 exhibits an increased resolution for the image, as can be seen from the parts in the boxes 506 and 508. The increased image resolution is mainly due to the change of pixel values for certain pixels in the original image 512. Due to the change of these pixel values, the transformed image 514 may then exhibit the increased resolution. In the disclosed rich content transformation system 100, these different output pixel values may be calculated by the rich content transformation application 105 hosted by the rich content transformation server 101, which are then transmitted to a client device 103a and applied through a function on the client device, to achieve the transformed image 514 with the increased resolution.

Figure 6:
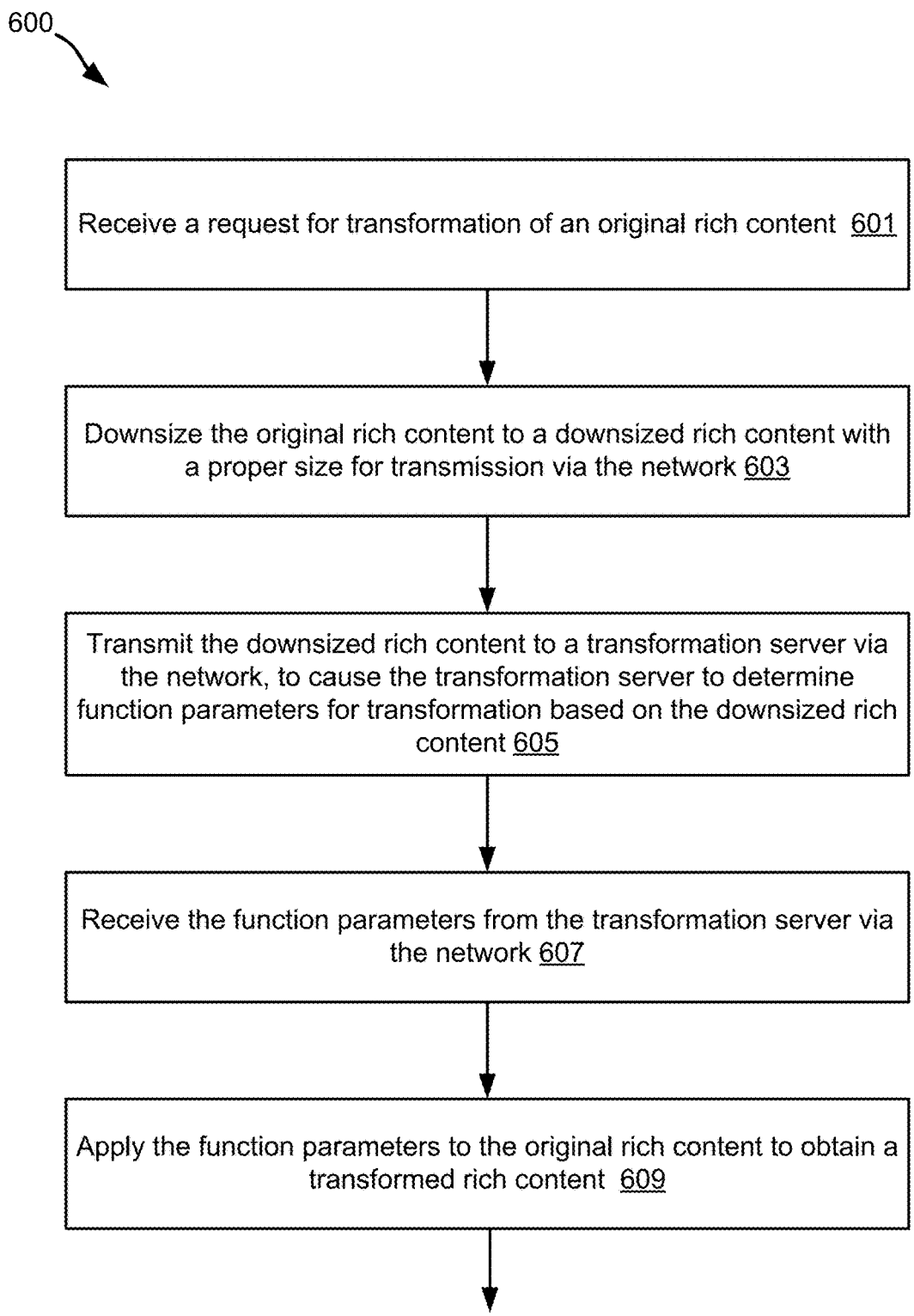
FIG. 6 is a flowchart of an example method for rich content transformation partially performed on a client device.

Referring now to FIG. 6, an example method 600 for rich content transformation partially performed on a client device is described. The method is implemented by a rich content transformation client 135 of a client device 103a communicating with the rich content transformation server 101. At block 601, the client device 103a receives a request for the transformation of a rich content. The rich content may be an image, a video, or another type of content. The rich content may be referred to as "original rich content" to differentiate it from a downsized rich content as will be described later. The original rich content may have original size and an original format or style. The request may be received from a user 125a through a user interface on the client device 103a. The request may include a target type of transformation, e.g., a target style of transformation for an image.

At block 603, the rich content transformation client 135 downsizes the original rich content to a proper size for transmission to the rich content transformation server 101. Different techniques may be applied to downsize the original rich content, which may include lowering the resolution and/or compressing the original rich content by a compressor, among other techniques. Depending on the original content size, the target transformation type, the network traffic, the network bandwidth, the resources of the client device 103a, etc., the original rich content may be downsized into different sizes and/or different types. The key point of downsizing the original rich content is to minimize the content to be transmitted via the network 109 without affecting the transformation performance, including the quality of the eventually transformed rich content.

At block 605, the downsized rich content is transmitted to the rich content transformation server 101, to cause the rich content transformation server 101 to determine function parameters to be used for the eventual transformation of the original rich content. The downsized rich content may be transmitted through the network 109, which may be a wireless network, and thus the rich content transformation server 101 is a cloud-based server. In one implementation, when transmitting the downsized rich content, the details for the request, metadata for the original rich content, and the specific downsizing details, among others, may be also transmitted to the rich content transformation server 101, which may be used in calculating the function parameters by the rich content transformation server 101. The specific process for determining the function parameters by the rich content transformation server 101 is described in detail below with reference to FIG. 7.

At block 607, the client device 103a receives the function parameters transmitted by the rich content transformation server 101. At block 609, the client device 103a applies the received function parameters to the original content to get the transformed rich content. In one implementation, the function for transforming the original rich content may be a very simple function that just applies the calculated function parameters to the original rich content to get the transformed rich content. That is, the function itself does not perform complicated function parameter calculation and thus can remain very small in size. Therefore, even a client device with very limited resources can perform this very simple function easily. Once the original rich content is transformed by the function, the transformed rich content may be then presented to the user 125a requesting the rich content transformation. The client device 103a may then present the transformed rich content to the user 125a, which may be a display of the transformed rich content on the client device 103a.

FIG. 7 is a flowchart of an example method 700 for calculating function parameters on a cloud-based server. The method is implemented by the rich content transformation server 101 communicating with the client device 103a. At block 701, the rich content transformation server 101 receives a downsized rich content transmitted from a client device over a network, where the downsized rich content is a downsized rich content downsized from an original rich content. When receiving the downsized rich content, the rich content transformation server 101 may also receive other information related to the downsized rich content as well as the information for the original rich content. For instance, the rich content transformation server 101 may receive the metadata for the original content including the resolution, the size, the format, and the date and time the rich content was taken, etc. Other information received by the rich content transformation server 101 may include the downsizing degree, the technique used to downsize, the client device transmitting the rich content, etc. Besides, the rich content transformation server 101 may also receive the specific information for the transformation request, such as the type of request, sent by the client device 103a.

At block 703, the rich content transformation server 101 identifies one or more models to transform the downsized rich content. In some implementations, the rich content transformation server 101 may include a plurality of machine learning models or non-machine learning models that may be applied to transform different rich contents for different requests. Accordingly, the rich content transformation server 101 may determine a proper model for the calculation of the function parameters. The rich content transformation server 101 may look into the request information, the information related to the downsized rich content, the information related to the original rich content, and/or the information related to the downsizing process, and determine a proper model for the calculation of function parameters based on the above information.

At block 705, the rich content transformation server 101 determines one or more function parameters based on a processing of the downsized rich content by the one or more models. The rich content transformation server 101 may use the selected model to calculate the function parameters. In one implementation, the selected model may be a machine learning model developed for the requested transformation. The machine learning model may be a convolution neural network that includes multiple layers for rich content transformation. The machine learning model may be pre-trained for the target transformation, and thus when the model is input with downsized rich content, the machine learning model may readily perform the certain rich content transformation, including calculating necessary function parameters to be used for image transformation. Depending on the target style, the inputs to the machine learning model may include the downsized rich content (e.g., a user captured photo) and position information related to the downsized rich content for some styles. For instance, for certain image styles, the corners are generally darker, which may be reflected in the input when calculating the function parameters.

As described above, the input rich content for calculating the function parameters is downsized rich content. The calculated function parameters may therefore include function parameters for the transformation of the downsized rich content. To allow the calculated function parameters to be applied to transform the original rich content on the client device 103a, the rich content transformation server 101 may further determine or derive function parameters for the partial content (e.g., other pixels not included in the downsized rich content) of the original rich content not included in the downsized rich content. The rich content transformation server 101 may rely on the downsizing information to determine or derive the function parameters for other pixels not presented in the downsized rich content. This may include matching the function parameters to the surrounding pixels that have been determined by the machine learning model. Other approaches for determining or deriving the function parameters of other pixels not presented in the downsized rich content are also possible.

At block 707, the function parameter forwarding module 227 forwards the one or more function parameters to the client device over the network, to allow the client device to transform the original rich content stored on the client device based on the one or more function parameters. By just transmitting the function parameters, instead of transformed the converted rich content, the bandwidth required for the transmission between the rich content transformation server 101 and the client device 103a can be greatly reduced.

Figure 8:
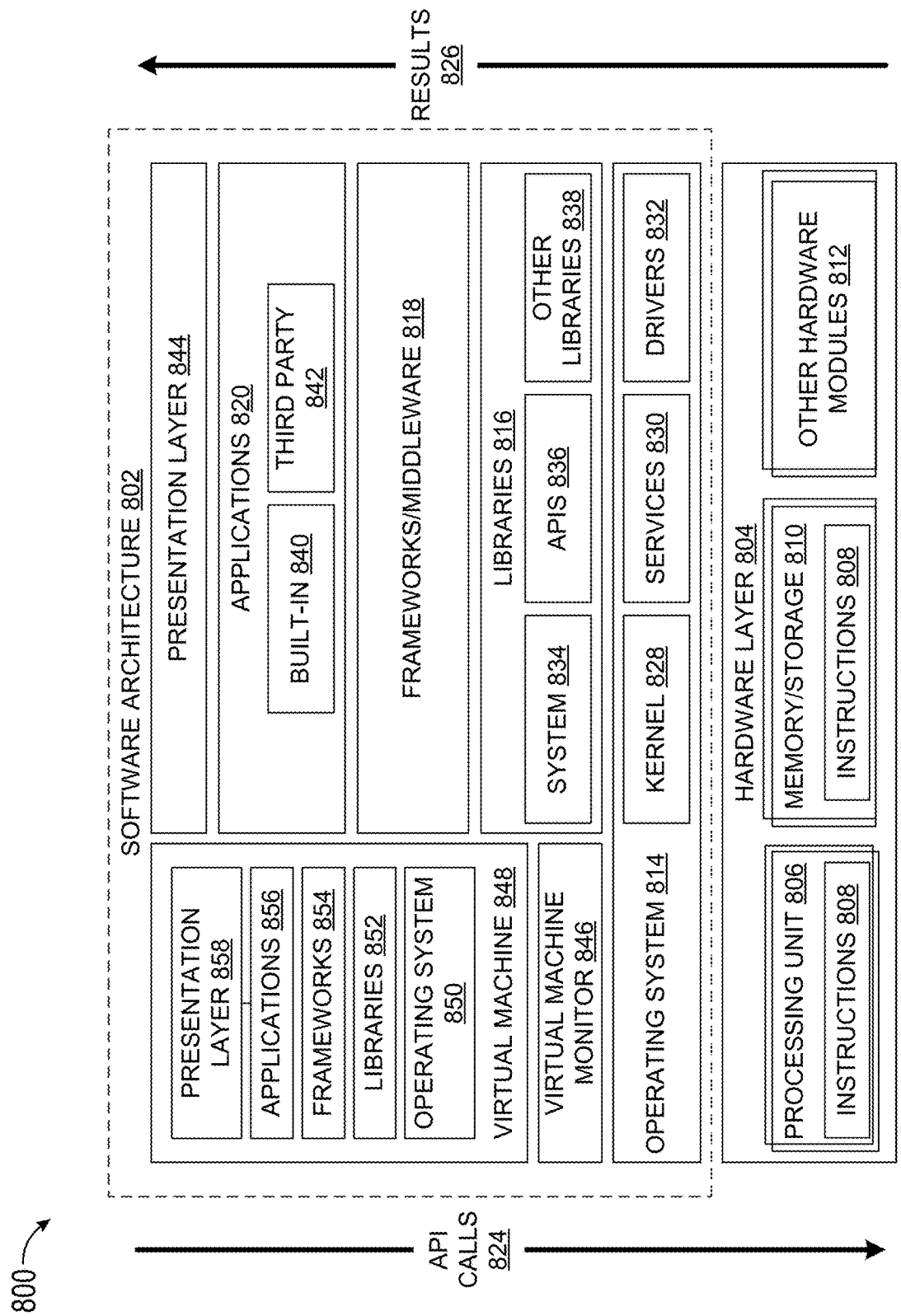
FIG. 8 is a block diagram illustrating an example software architecture.

FIG. 8 is a block diagram 800 illustrating an example software architecture 802, various portions of which may be used in conjunction with various hardware architectures herein described, which may implement any of the above-described features. FIG. 8 is a non-limiting example of software architecture and it will be appreciated that many other architectures may be implemented to facilitate the functionality described herein. The software architecture 802 may execute on hardware such as a machine 900 of FIG. 9 that includes, among other things, processors 910, memory 930, and input/output (I/O) components 980. A representative hardware layer 804 is illustrated and can represent, for example, the machine 900 of FIG. 9. The representative hardware layer 804 includes a processing unit 806 and associated executable instructions 808. The executable instructions 808 represent executable instructions of the software architecture 802, including implementation of the methods, modules and so forth described herein. The hardware layer 804 also includes a memory/storage 810, which also includes the executable instructions 808 and accompanying data. The hardware layer 804 may also include other hardware modules 812. Instructions 808 held by processing unit 806 may be portions of instructions 808 held by the memory/storage 810.

The example software architecture 802 may be conceptualized as layers, each providing various functionality. For example, the software architecture 802 may include layers and components such as an operating system (OS) 814, libraries 816, frameworks 818, applications 820, and a presentation layer 844. Operationally, the applications 820 and/or other components within the layers may invoke API calls 824 to other layers and receive corresponding results 826. The layers illustrated are representative in nature and other software architectures may include additional or different layers. For example, some mobile or special purpose operating systems may not provide the frameworks/middleware 818.

The OS 814 may manage hardware resources and provide common services. The OS 814 may include, for example, a kernel 828, services 830, and drivers 832. The kernel 828 may act as an abstraction layer between the hardware layer 804 and other software layers. For example, the kernel 828 may be responsible for memory management, processor management (for example, scheduling), component management, networking, security settings, and so on. The services 830 may provide other common services for the other software layers. The drivers 832 may be responsible for controlling or interfacing with the underlying hardware layer 804. For instance, the drivers 832 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 816 may provide a common infrastructure that may be used by the applications 820 and/or other components and/or layers. The libraries 816 typically provide functionality for use by other software modules to perform tasks, rather than interacting directly with the OS 814. The libraries 816 may include system libraries 834 (for example, C standard library) that may provide functions such as memory allocation, string manipulation, file operations. In addition, the libraries 816 may include API libraries 836 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 816 may also include a wide variety of other libraries 838 to provide many functions for applications 820 and other software modules.

The frameworks 818 (also sometimes referred to as middleware) provide a higher-level common infrastructure that may be used by the applications 820 and/or other software modules. For example, the frameworks 818 may provide various graphic user interface (GUI) functions, high-level resource management, or high-level location services. The frameworks 818 may provide a broad spectrum of other APIs for applications 820 and/or other software modules.

The applications 820 include built-in applications 840 and/or third-party applications 842. Examples of built-in applications 840 may include, but are not limited to, a contacts application, a browser application, a location application, a media application, a messaging application, and/or a game application. Third-party applications 842 may include any applications developed by an entity other than the vendor of the particular platform. The applications 820 may use functions available via OS 814, libraries 816, frameworks 818, and presentation layer 844 to create user interfaces to interact with users.

Some software architectures use virtual machines, as illustrated by a virtual machine 848. The virtual machine 848 provides an execution environment where applications/modules can execute as if they were executing on a hardware machine (such as the machine 900 of FIG. 9, for example). The virtual machine 848 may be hosted by a host OS (for example, OS 814) or hypervisor, and may have a virtual machine monitor 846 which manages operation of the virtual machine 848 and interoperation with the host operating system. A software architecture, which may be different from software architecture 802 outside of the virtual machine, executes within the virtual machine 848 such as an OS 850, libraries 852, frameworks 854, applications 856, and/or a presentation layer 858.

Figure 9:
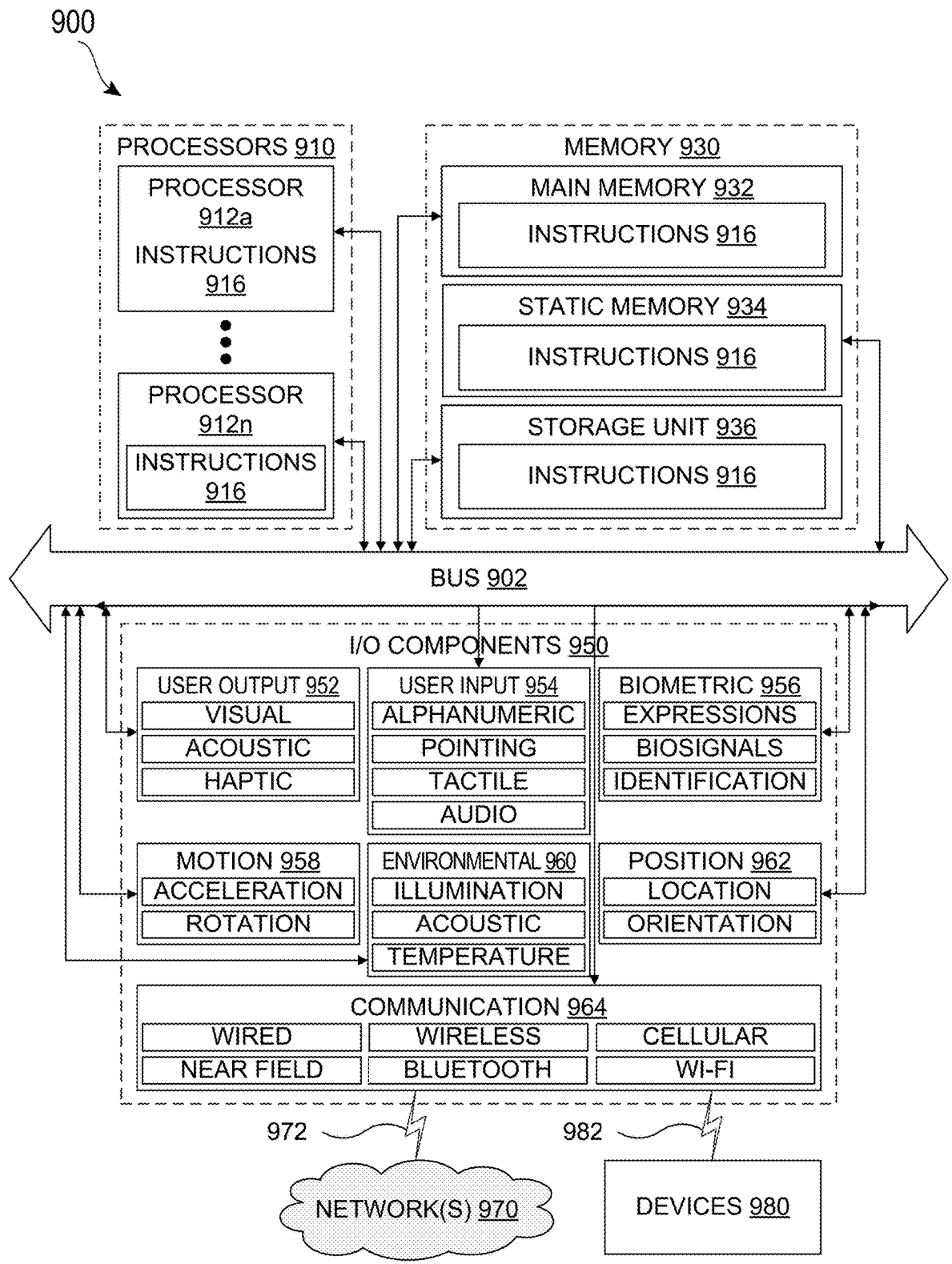
FIG. 9 is a block diagram illustrating components of an example machine configured to read instructions from a machine-readable medium.

FIG. 9 is a block diagram illustrating components of an example machine 900 configured to read instructions from a machine-readable medium (for example, a machine-readable storage medium) and perform any of the features described herein. The example machine 900 is in a form of a computer system, within which instructions 916 (for example, in the form of software components) for causing the machine 900 to perform any of the features described herein may be executed. As such, the instructions 916 may be used to implement modules or components described herein. The instructions 916 cause unprogrammed and/or unconfigured machine 900 to operate as a particular machine configured to carry out the described features. The machine 900 may be configured to operate as a standalone device or may be coupled (for example, networked) to other machines. In a networked deployment, the machine 900 may operate in the capacity of a server machine or a client machine in a server-client network environment, or as a node in a peer-to-peer or distributed network environment. Machine 900 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 900 is illustrated, the term "machine" includes a collection of machines that individually or jointly execute the instructions 916.

The machine 900 may include processors 910, memory 930, and I/O components 950, which may be communicatively coupled via, for example, a bus 902. The bus 902 may include multiple buses coupling various elements of machine 900 via various bus technologies and protocols. In an example, the processors 910 (including, for example, a central processing qunit (CPU), a graphics processing unit (GPU), a digital signal processor (DSP), an ASIC, or a suitable combination thereof) may include one or more processors 912a to 912n that may execute the instructions 916 and process data. In some examples, one or more processors 910 may execute instructions provided or identified by one or more other processors 910. The term "processor" includes a multi-core processor including cores that may execute instructions contemporaneously. Although FIG. 9 shows multiple processors, the machine 900 may include a single processor with a single core, a single processor with multiple cores (for example, a multi-core processor), multiple processors each with a single core, multiple processors each with multiple cores, or any combination thereof. In some examples, the machine 900 may include multiple processors distributed among multiple machines.

The memory/storage 930 may include a main memory 932, a static memory 934, or other memory, and a storage unit 936, both accessible to the processors 910 such as via the bus 902. The storage unit 936 and memory 932, 934 store instructions 916 embodying any one or more of the functions described herein. The memory/storage 930 may also store temporary, intermediate, and/or long-term data for processors 910. The instructions 916 may also reside, completely or partially, within the memory 932, 934, within the storage unit 936, within at least one of the processors 910 (for example, within a command buffer or cache memory), within memory at least one of I/O components 950, or any suitable combination thereof, during execution thereof. Accordingly, the memory 932, 934, the storage unit 936, memory in processors 910, and memory in I/O components 950 are examples of machine-readable media.

As used herein, "machine-readable medium" refers to a device able to temporarily or permanently store instructions and data that cause machine 900 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 916) for execution by a machine 900 such that the instructions, when executed by one or more processors 910 of the machine 900, cause the machine 900 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 950 may include a wide variety of hardware components adapted to receive input, provide output, produce output, transmit information, exchange information, capture measurements, and so on. The specific I/O components 950 included in a particular machine will depend on the type and/or function of the machine. For example, mobile devices such as mobile phones may include a touch input device, whereas a headless server or IoT device may not include such a touch input device. The particular examples of I/O components illustrated in FIG. 9 are in no way limiting, and other types of components may be included in machine 900. The grouping of I/O components 950 are merely for simplifying this discussion, and the grouping is in no way limiting. In various examples, the I/O components 950 may include user output components 952 and user input components 954. User output components 952 may include, for example, display components for displaying information (for example, a liquid crystal display (LCD) or a projector), acoustic components (for example, speakers), haptic components (for example, a vibratory motor or force-feedback device), and/or other signal generators. User input components 954 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 950 may include biometric components 956, motion components 958, environmental components 960, and/or position components 962, among a wide array of other physical sensor components. The biometric components 956 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 958 may include, for example, acceleration sensors (for example, an accelerometer) and rotation sensors (for example, a gyroscope). The environmental components 960 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 962 may include, for example, location sensors (for example, a Global Position System (GPS) receiver), altitude sensors (for example, an air pressure sensor from which altitude may be derived), and/or orientation sensors (for example, magnetometers).

The I/O components 950 may include communication components 964, implementing a wide variety of technologies operable to couple the machine 900 to network(s) 970 and/or device(s) 980 via respective communicative couplings 972 and 982. The communication components 964 may include one or more network interface components or other suitable devices to interface with the network(s) 970. The communication components 964 may include, for example, components adapted to provide wired communication, wireless communication, cellular communication, Near Field Communication (NFC), Bluetooth communication, Wi-Fi, and/or communication via other modalities. The device(s) 980 may include other machines or various peripheral devices (for example, coupled via USB).

In some examples, the communication components 964 may detect identifiers or include components adapted to detect identifiers. For example, the communication components 964 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 962, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for rich content transformation, the system comprising:
a processor; and
a memory, coupled to the processor and configured to store executable instructions that, when executed by the processor, cause the processor to:
receive a downsized rich content transmitted from a client device over a network, wherein the downsized rich content is a content downsized on the client device from an original rich content;
identify one or more models to transform the downsized rich content;
determine one or more function parameters based on a processing of the downsized rich content by the one or more models; and
transmit the one or more function parameters to the client device over the network, to allow the client device to transform the original rich content stored on the client device based on the one or more function parameters.

2. The system of claim 1, wherein a size of the downsized rich content is determined based on one or more of a purpose of the transformation of the original rich content, a bandwidth of the network, a traffic of the network, a size of the original rich content, or a format of the original rich content.

3. The system of claim 1, wherein the one or more models are identified based on a purpose of the transformation of the original rich content.

4. The system of claim 1, wherein the one or more models comprises a machine learning model configured to transform the downsized rich content.

5. The system of claim 4, wherein the machine learning model comprises a convolutional neural network configured to transform the downsized rich content.

6. The system of claim 1, wherein the one or more function parameters are applied to the original rich content on the client device, to transform the original rich content to a transformed rich content.

7. The system of claim 6, wherein the one or more function parameters are applied to a linear function on the client device to obtain the transformed rich content.

8. The system of claim 6, wherein the transformed rich content displays a different style from the original rich content on the client device after the transformation.

9. The system of claim 6, wherein the transformed rich content displays a different resolution from the original rich content on the client device after the transformation.

10. The system of claim 6, wherein the transformed rich content displays a different brightness from the original rich content on the client device after the transformation.

11. The system of claim 6, wherein the transformed rich content displays a different clarity from the original rich content on the client device after the transformation.

12. The system of claim 1, wherein, to determine the one or more function parameters based on the processing of the downsized rich content by the one or more models, the executable instructions further include instructions that, when executed by the processor, cause the system to:
  determine a first set of function parameters corresponding to content included in the downsized rich content; and
  determine a second set of function parameters corresponding to content not included in the downsized rich content but included in the original rich content.

13. The system of claim 12, wherein the first set of function parameters are determined in a process of transforming the downsized rich content by the one or more models.

14. The system of claim 1, wherein the network is a wireless network.

15. A method for rich content transformation, the method comprising:
  receiving a downsized rich content transmitted from a client device over a network, wherein the downsized rich content is a content downsized on the client device from an original rich content;
  identifying one or more models to transform the downsized rich content;
  determining one or more function parameters based on a processing of the downsized rich content by the one or more models; and
  transmitting the one or more function parameters to the client device over the network, to allow the client device to transform the original rich content stored on the client device based on the one or more function parameters.

16. The method of claim 15, wherein a size of the downsized rich content is determined based on one or more of a purpose of the transformation of the original rich content, a bandwidth of the network, a traffic of the network, a size of the original rich content, or a format of the original rich content.

17. The method of claim 15, wherein the one or more models are identified based on a purpose of the transformation of the original rich content.

18. The method of claim 15, wherein the one or more models comprises a machine learning model configured to transform the downsized rich content.

19. The method of claim 15, wherein the one or more function parameters are applied to the original rich content on the client device, to transform the original rich content to a transformed rich content.

20. The method of claim 15, wherein the network is a wireless network.

* * * * *